United States Patent
Al Oraifi et al.

(10) Patent No.: US 12,485,378 B2
(45) Date of Patent: Dec. 2, 2025

(54) METHODS AND SYSTEMS FOR RESTORING ADSORPTIVE CAPACITY OF A MOLECULAR SIEVE-BASED DEHYDRATION UNIT

(71) Applicant: SAUDI ARABIAN OIL COMPANY, Dhahran (SA)

(72) Inventors: Abdullah Al Oraifi, Jubail (SA); Diki Andrian, Jubail (SA); Amjad Alshaer, Jubail (SA); Abdulrahman M. Al-Harbi, Jubail (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 357 days.

(21) Appl. No.: 18/338,072

(22) Filed: Jun. 20, 2023

(65) Prior Publication Data
US 2024/0424439 A1    Dec. 26, 2024

(51) Int. Cl.
| | | |
|---|---|---|
| *B01D 53/047* | (2006.01) | |
| *B01D 53/04* | (2006.01) | |
| *B01D 53/26* | (2006.01) | |
| *C10L 3/10* | (2006.01) | |

(52) U.S. Cl.
CPC ....... *B01D 53/0438* (2013.01); *B01D 53/047* (2013.01); *B01D 53/261* (2013.01); *B01D 2253/116* (2013.01); *B01D 2256/245* (2013.01); *B01D 2257/80* (2013.01);
(Continued)

(58) Field of Classification Search
CPC .. B01D 53/04; B01D 53/047; B01D 53/0438; B01D 53/261; B01D 53/0462; B01D 2253/116; B01D 2256/245; B01D 2257/80; B01D 2259/3009; C10L 3/106; C10L 2290/542
USPC .............. 95/96–99, 104–106, 114, 115, 117, 95/121–126; 34/80, 472, 473
See application file for complete search history.

(56) References Cited

U.S. PATENT DOCUMENTS

| | | | |
|---|---|---|---|
| 4,045,191 A | | 8/1977 | Martin |
| 4,784,672 A | * | 11/1988 | Sircar ................ B01D 53/0462 95/143 |
| 10,105,637 B2 | | 10/2018 | Hashi et al. |

(Continued)

OTHER PUBLICATIONS

Gandhidasan, Palanichamy, Abdulghani A. Al-Farayedhi and Ali A. Al-Mubarak. "Dehydration of natural gas using solid desiccants." Energy 26 (2001): 855-868.

(Continued)

*Primary Examiner* — Frank M Lawrence, Jr.
(74) *Attorney, Agent, or Firm* — Vorys, Sater, Seymour and Pease LLP (57) ABSTRACT

An improved method of restoring the adsorptive capacity of a molecular sieve-based dehydration unit utilized in drying a hydrocarbon gas. The method includes a gas dehydration step, a depressurization step, a sweeping step, a heating step and a cooling step. During the sweeping step, a regeneration gas is introduced into the molecular sieve-based dehydration unit at a sweeping temperature and sweeping flow rate to result in the smooth removal of heavy hydrocarbons prior to the heating step. The improved regeneration process decreases spikes in the heating value of a product gas after blending with the regeneration gas that occur during the heating step of prior art regeneration processes.

20 Claims, 5 Drawing Sheets

(52) U.S. Cl.
CPC ...... *B01D 2259/4009* (2013.01); *C10L 3/106* (2013.01); *C10L 2290/542* (2013.01)

(56) References Cited

U.S. PATENT DOCUMENTS

| | | | | |
|---|---|---|---|---|
| 2011/0132033 | A1* | 6/2011 | Prim | F25J 3/0242 |
| | | | | 62/618 |
| 2012/0042689 | A1* | 2/2012 | Bresler | B01D 53/261 |
| | | | | 95/114 |
| 2014/0345320 | A1* | 11/2014 | Xuan | F25J 3/061 |
| | | | | 62/620 |
| 2020/0129919 | A1* | 4/2020 | Lanfrey | B01D 3/14 |

OTHER PUBLICATIONS

Farag, Hassan A., Mustafa Mohamed Ezzat, Hoda Amer and Adel W. Nashed. "Natural gas dehydration by desiccant materials." alexandria engineering journal 50 (2011): 431-439.

* cited by examiner

METHODS AND SYSTEMS FOR RESTORING ADSORPTIVE CAPACITY OF A MOLECULAR SIEVE-BASED DEHYDRATION UNIT

FIELD OF THE DISCLOSURE

The present disclosure relates generally to systems and processes for dehydrating gases and, more particularly, to systems for restoring the adsorptive capacity of a molecular sieve-based dehydration unit.

BACKGROUND OF THE DISCLOSURE

A wet gas, such as natural gas produced from underground reservoirs, is typically saturated with water. Removing this water via dehydration processing is a fundamental step to prevent the formation of corrosive hydrates during later gas processing steps. Molecular sieve-based dehydration is the most commonly used method for drying a wet gas prior to further processing in cryogenic units.

Molecular sieve-based dehydration units utilize adsorbers to adsorb water from the wet gas. Typically, at a processing facility, multiple molecular sieve-based dehydration units operate in alternating cycles of being in dehydration mode and regeneration mode. During the dehydration mode, the molecular sieve-based dehydration unit adsorbs moisture from the wet feed gas. Once the adsorbers in a molecular sieve-based dehydration unit becomes saturated with moisture removed from the wet gas, the unit enters the regeneration mode. During the regeneration mode, a slip-stream from a gas product line, such as a methane product line, is introduced to the molecular sieve-based dehydration unit as a dry regeneration gas to remove moisture from the saturated adsorbers. This process results in the restoration of adsorptive capacity of the molecular sieve-based dehydration unit and produces a water saturated regeneration gas, which is also known as a "wet regeneration gas" or a "rich regeneration gas." The wet regeneration gas leaving the molecular sieve-based dehydration unit is then treated to remove the carried moisture before being diverted back to the product line.

It has been observed that the heating value of the gas in the product line spikes when the molecular sieve-based dehydration unit is in the regeneration mode. These heating value spikes can be disadvantageous for downstream processes that require a product gas with a steady heating value. There is a need to understand the mechanisms that result in the heating value spikes and to develop processes for regenerating saturated molecular sieve-based dehydration units that do not result in significant spikes in the heating value of the gas in the product line.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a method of restoring the adsorptive capacity of a molecular sieve-based dehydration unit utilized in drying a hydrocarbon gas, the method may include feeding a wet hydrocarbon gas through a molecular sieve-based dehydration unit at an operating pressure and thereby discharging a dry hydrocarbon gas, at least partially saturating adsorbers included in the molecular sieve-based dehydration unit with water and trapped heavy hydrocarbons from the wet hydrocarbon gas, depressurizing the saturated molecular sieve-based dehydration unit from the operating pressure to a pressure less than or equal to a pressure of a hydrocarbon regeneration gas, sweeping the molecular sieve-based dehydration unit with the hydrocarbon regeneration gas at a sweeping flow rate and at a sweeping temperature, heating the regeneration gas to an elevated temperature greater than the sweeping temperature and thereby generating a heated regeneration gas, heating the molecular sieve-based dehydration unit with the heated regeneration gas at a flow rate that is greater than the sweeping flow rate for a duration sufficient to restore the adsorptive capacity of the molecular sieve-based dehydration unit, and cooling the molecular sieve-based dehydration unit to the operating temperature.

In another embodiment, a method of removing trapped heavy hydrocarbons from a molecular sieve-based dehydration unit, the method may include sweeping a molecular sieve-based dehydration unit containing trapped heavy hydrocarbons with a hydrocarbon regeneration gas at a sweeping flow rate and at a sweeping temperature, wherein the sweeping flow rate and the sweeping temperature are sufficient to remove the trapped heavy hydrocarbons from the molecular sieve-based dehydration unit while not raising a heating value of a product gas blended with the regeneration gas exiting the molecular sieve-based dehydration unit to a value greater than a threshold heating value.

In a further embodiment, a method of maintaining a heating value of a product gas blended with a regeneration gas below a threshold heating value during regeneration of a molecular sieve-based dehydration unit utilized in drying a hydrocarbon gas, the method may include releasing trapped heavy hydrocarbons from a saturated molecular sieve-based dehydration unit into a regeneration gas introduced into the molecular sieve-based dehydration unit at a sweeping flow rate and a sweeping temperature and introducing the regeneration gas into a product gas, wherein the sweeping flow rate and the sweeping temperature results in the heating value of the product gas after introduction of the regeneration gas remaining below a threshold heating value.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to systems and processes for dehydrating gases and, more particularly, to improved processes and systems for restoring the adsorptive capacity of a molecular sieve-based dehydration unit. Molecular sieve-based dehydration units are commonly used to remove water from wet gas streams, such as natural gas streams, to prevent hydrate formation in downstream processes, such as cryogenic fractionation processes. Typically, several molecular sieve-based dehydration units operate in parallel to remove moisture from the wet gas stream to supply dry gas for downstream processes. Each of the molecular sieve-based dehydration units cycle between dehydration mode and regeneration mode. At a given moment, a molecular sieve-based dehydration unit may be in regeneration mode while others are in dehydration mode.

When in dehydration mode, the molecular sieve-based dehydration unit removes moisture from the wet gas to produce a dry gas, which results in the dehydration unit becoming saturated with water. This moisture is removed during the regeneration mode. As described in greater detail herein, the improved regeneration process, in accordance with embodiments of the disclosure, includes a depressurization step, a sweeping step, a heating step, and a cooling step. The incorporation of the sweeping step into the improved regeneration process provides the advantage of stabilizing the heating value of gas in the product line in a molecular sieve-based dehydration unit is in the regeneration mode. Details of the improved regeneration process are set forth below.

Figure 1:
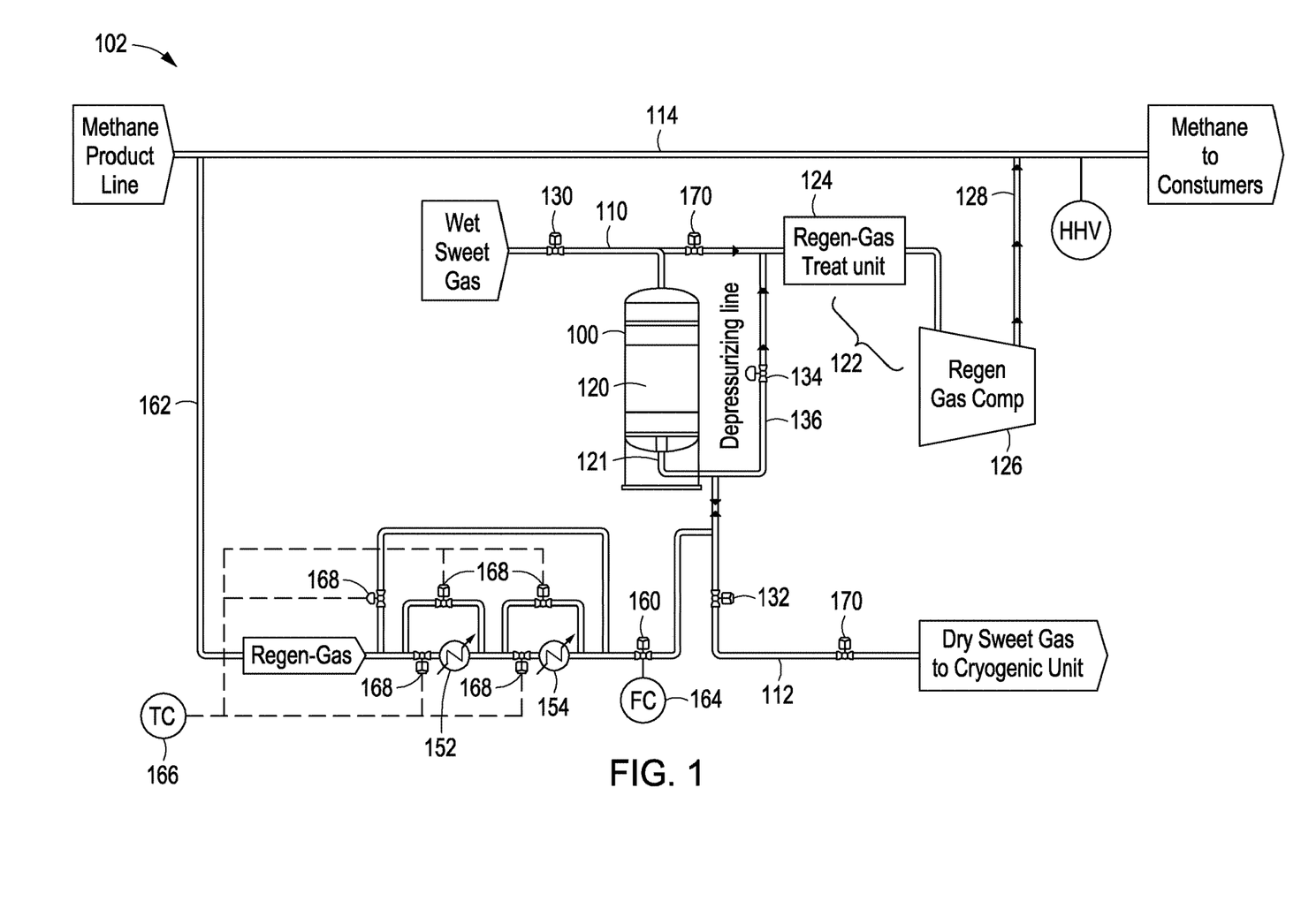
FIG. 1 is a schematic of a molecular sieve-based dehydration unit.

FIG. 1 is a schematic illustration of a molecular sieve-based dehydration unit 100 and associated components which form a molecular sieve-based dehydration system 102. A wet gas, such as a wet hydrocarbon gas or a wet sweet gas, is fed into the molecular sieve-based dehydration unit 100 via a wet gas conduit 110. Moisture is removed from the wet gas in the molecular sieve-based dehydration unit 100, thereby producing (discharging) a dry gas. The dry gas exits the bottom of the molecular sieve-based dehydration unit 100 via a bottom conduit 121 before being conveyed to a downstream processing facility via a dry gas conduit 112 where it may be further fractionated to produce a product gas. The product gas from the downstream processing facility may then be conveyed through a product gas line 114 to, for example, a storage site or a customer for use. In embodiments, product gas may be a hydrocarbon gas and in other embodiments, the product gas is methane.

The molecular sieve-based dehydration unit 100 includes adsorbers 120 that adsorb moisture from the wet gas when in the dehydration mode. When operating in the dehydration mode, the molecular sieve-based dehydration unit 100 is operated at a temperature and a pressure sufficient to allow the adsorbers 120 to remove moisture from the wet gas to produce a dry gas. The temperature and pressure during the dehydration mode may be referred to as an operating temperature and operating pressure. In an embodiment, the operating temperature may be an ambient temperature and in other embodiments, the operating temperature may be less than about 80° F. and in other embodiments, the operation temperature may be in a range between about 65° F. to about 75° F. In embodiments, the operating pressure may be in a range between about 780 psig and about 820 psig.

After the adsorbers 120 become saturated, the molecular sieve-based dehydration unit 100 is transitioned to (enters) the regeneration mode. One of ordinary skill will understand that when used in the context of the adsorbers in a molecular sieve-based dehydration unit 100, the term "saturated" may include adsorbers that are saturated to maximum capacity and adsorbers that are partially saturated. In an embodiment, saturated adsorbers 120 include adsorbers that are saturated to about a 90% saturation level.

During the regeneration mode, a stream of product gas from the product line 114 is introduced to the molecular sieve-based dehydration unit 100 as a regeneration gas to regenerate the adsorbers 120 and restore the adsorptive capacity of the molecular sieve-based dehydration unit 100. In an embodiment, the stream of product gas is a partial stream of product gas, which may also be described as a slip-stream of product gas. As the regeneration gas passes through the molecular sieve-based dehydration unit 100, water in the adsorbers 120 is carried (transferred) to the regeneration gas to form a wet regeneration gas. The wet regeneration gas discharged from the top of the molecular sieve-based dehydration unit 100 is then conveyed to and treated in a regeneration gas treatment system 122 to remove the carried moisture, thereby producing a dry regeneration gas. As illustrated, the regeneration gas treatment system 122 may include a regeneration gas dehydration unit 124 and regeneration gas compressor 126. The dry regeneration gas may be diverted back to the product line 114 via conduit 128.

In embodiments, the improved regeneration process for the molecular sieve-based dehydration unit 100 proceeds automatically through several sequential steps. First, the molecular sieve-based dehydration unit 100 is depressurized from its operating pressure to a pressure that allows the product gas from the product line 114 to flow into the molecular sieve-based dehydration unit 100 as the regeneration gas. This step is performed because the molecular sieve-based dehydration unit 100 operates at a higher pressure compared to product gas in the product line 114. During the depressurization step, valves 130 and 132 in the wet gas conduit 110 are closed and a pressure control valve 134 in a depressurization line 136 extending from the bottom of the molecular sieve-based dehydration unit 100 is opened. This allows the pressure in the molecular sieve-based dehydration unit 100 to drop from the operating pressure to the pressure of the product gas in the product line 114.

Figure 2:
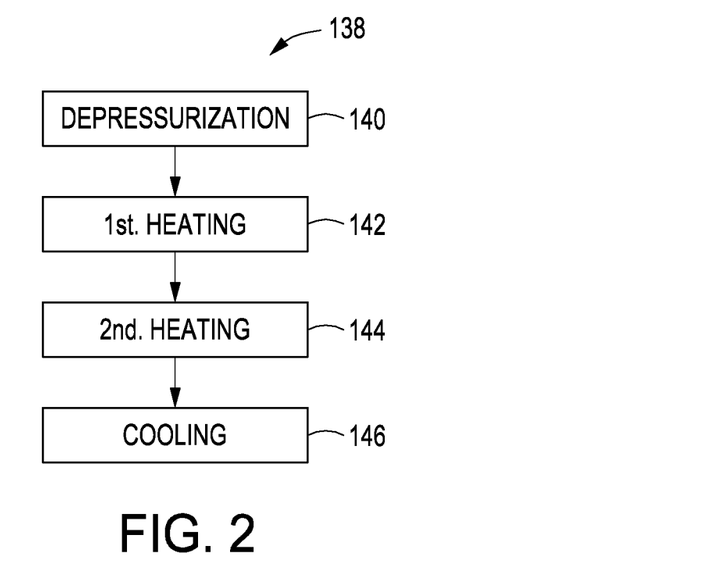
FIG. 2 is a flow chart of the prior art regeneration process for a molecular sieve-based dehydration unit.

The improved regeneration process of the present disclosure is more easily understood in comparison with the prior art regeneration process. FIG. 2 is a schematic flow chart showing the steps of a prior art regeneration process, in which immediately after a depressurization step 140, the molecular sieve-based dehydration unit 100 is heated in a first heating step 142 followed by a second heating step 144. During the heating steps, the regeneration gas is heated in a first heater or second heater prior to introduction into the molecular sieve-based dehydration unit 100. The heated regeneration gas flows through the adsorbers of the molecular sieve-based dehydration unit to dry the adsorbers and thereby restore the adsorptive capacity of the molecular sieve-based dehydration unit 100. After the adsorbers are regenerated, the molecular sieve-based dehydration unit is cooled in a cooling step 146 to the operation temperature for the dehydration mode.

Figure 3:
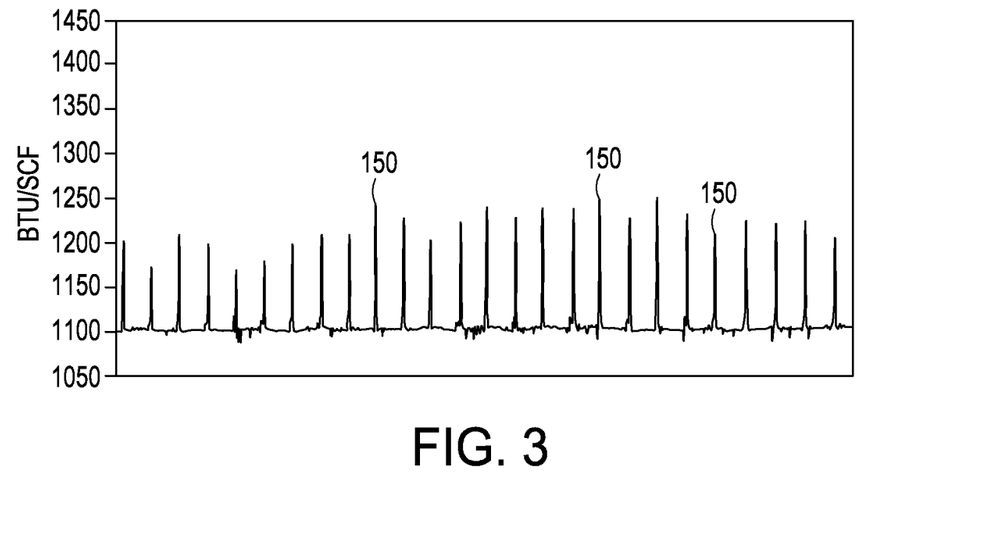
FIG. 3 is a graph of representative data showing spikes in the heating value of a methane product line during the regeneration mode of a molecular sieve-based dehydration unit using prior art processes.

FIG. 3 is a graph of representative data showing spikes 150 in the heating value (i.e., higher BTU value) of a methane product line observed over a period of 14 days when using the prior art (conventional) regeneration process. The heating value spikes 150 correspond to a molecular sieve-based dehydration unit being in the regeneration mode. During the development of the present improved regeneration process, it was found that the heating value spikes 150 were primarily caused by the large difference in heating value between the sweet gas that was being treated in the molecular sieve-based dehydration unit 100 and the product gas. In particular, the wet sweet gas contains heavy hydrocarbons. Heavy hydrocarbons are hydrocarbons that have higher heating values compared to the heating value of the product gas. During the dehydration mode, some portion of these heavy hydrocarbons become trapped in the molecular sieve-based dehydration unit. During the heating step of the prior art regeneration process, the heated regeneration gas introduced into the molecular sieve-based dehydration unit 100 to remove moisture from the adsorbers 120 would also release the trapped heavy hydrocarbons. While the moisture in the regeneration gas may be removed in the regeneration gas treatment system 122 (FIG. 1), the heavy hydrocarbons are carried in the resulting dry regeneration gas at a high flowrate to the product line 114 resulting in the heating value spikes in product gas in the product line 114 observed in FIG. 2. As discussed in greater detail below in the Example, it was observed that the trapped heavy hydrocarbons were released when the regeneration gas heated during the first heating step was introduced into the molecular sieve-based dehydration unit.

Figure 4:
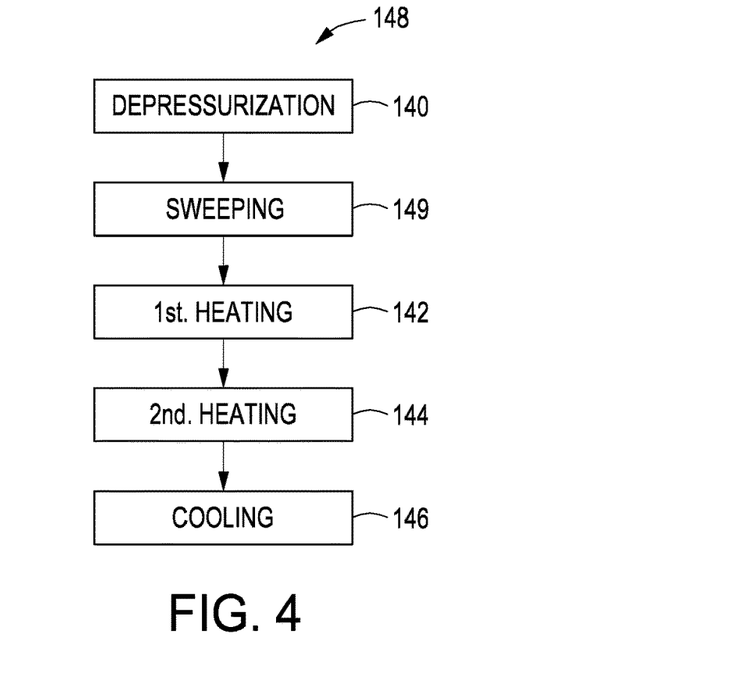
FIG. 4 is a flow chart of an improved regeneration process for a molecular sieve-based dehydration unit that results in minimized increases in the heating value of a gas product line in accordance with embodiments of the disclosure.

FIG. 4 is a schematic flow chart depicting example steps of an embodiment of an improved regeneration process 148 in accordance with the principles of the present disclosure, which adds a sweeping step 149 between the depressurization step 140 and the first heating step 142 of the prior art regeneration process. Accordingly, embodiments are directed to an improved regeneration process 148 that include a depressurization step 140, a sweeping step 149, one or more heating steps 142, 144, and a cooling step 146. The sweeping step 149 significantly minimizes the fluctuations in the heating value of the product gas by smoothly removing trapped heavy hydrocarbons from the adsorbers 120. Upon stabilizing the heating value of product gas in product line 114, regeneration gas can be diverted to the product line to be used in processes requiring a consistent heating value.

In an embodiment, during the sweeping step 149, the regeneration gas is introduced at a "sweeping" temperature and a "sweeping" flow rate that does not result in the regeneration gas exiting the molecular sieve-based dehydration unit 100 causing a heating value in the product gas, after the regeneration gas has been blended into the product gas stream, to not exceed a threshold heating value. In embodiments, the sweeping temperature and sweeping flow rate are selected to result in the selective removal of heavy hydrocarbons from the adsorbers 120 while not removing a significant fraction of water. In embodiments, the sweeping step 149 includes introducing an unheated regeneration gas into the molecular sieve-based dehydration unit 100 at a low flowrate. In an embodiment, the sweeping temperature of the regeneration gas is a temperature that is less than the temperature of the first or second heating steps discussed below. In embodiments, the sweeping temperature is an ambient temperature whereby the regeneration gas is not heated in a heating unit. In other embodiments, the sweeping temperature of the regeneration gas does not exceed 120° F. In other embodiments, the sweeping gas temperature is in a range between about 90° F. and about 110° F.

In an embodiment, the sweeping flow rate is less than about 20 Million Standard Cubic Feet Per Day ("MMSCFD"). In another embodiment, the sweeping flow rate is less than about 10 MMSCFD. In another embodiment, the sweeping flow rate is less than about 7 MMSCFD. In another embodiment, the sweeping flow rate is less than about 5 MMSCFD. In embodiments, the sweeping flow rate is in a range from about 20 MMSCFD to about 5 MMSCFD. In other embodiments, the sweeping flow rate is in a range from about 10 MMSCFD to about 5 MMSCFD. In other embodiments, the sweeping flow rate is in a range from about 7 MMSCFD to about 5 MMSCFD. In other embodiments, the sweeping flow rate is about 5 MMSCFD.

In embodiments, the threshold heating value is a predetermined heating value that is less than the maximum heating value that would result during the first or second heating steps. In embodiments, the threshold heating value is not more than about 10% greater than the heating value of the regeneration gas entering the saturated molecular sieve-based dehydration unit 100. In embodiments, the threshold heating value is not more than about 5% greater than the heating value of the regeneration gas entering the saturated molecular sieve-based dehydration unit 100. In embodiments, the threshold heating value is not more than about 75 British Thermal Units per Standard Cubic Foot ("BTU/SCF") greater than the heating value of the regeneration gas entering the saturated molecular sieve-based dehydration unit 100. In embodiments, the threshold heating value is not more than about 50 BTU greater than the heating value of the regeneration gas entering the saturated molecular sieve-based dehydration unit 100. In embodiments, the threshold heating value is a standard deviation of the heating values of the product gas while the regeneration gas is being blended into the product gas, wherein the standard deviation of the measured heating values may be less than about 7 BTU/SCF.

In embodiments, during the sweeping step, the regeneration gas is introduced into the molecular sieve-based dehydration unit 100 for a duration sufficient to remove the majority of the heavy hydrocarbons from the adsorbers 120. In an embodiment, the duration of the sweeping step results in the removal of enough heavy hydrocarbons so that when the molecular sieved-based dehydration unit 100 is in the first or second heating steps, the heating value of the regeneration gas exiting the molecular sieve-based dehydration unit 100 does not exceed a threshold heating value. In embodiments, the duration of the sweeping step is for a predetermined duration. In other embodiments, the duration of the sweeping step is in a range from about 0.5 hours to about 1.5 hours. In other embodiments, the duration of the sweeping step is about 1 hour.

After the completion of the sweeping step 149, the improved regeneration process 148 proceeds into the heating step 142, 144 followed by the cooling step 146. During the heating step 142, 144, the molecular sieve-based dehydration unit 100 is heated by the regeneration gas, which may be heated in a regeneration gas heater to an elevated temperature prior to introduction into the molecular sieve-based dehydration unit 100. In an embodiment, the heating step 142, 144 includes at least two sequential heating steps, wherein in a first heating step 142 the regeneration gas is heated, such as in a first heater 152 (FIG. 1), to a first temperature. In a subsequent or second heating step 144, the regeneration gas is heated, such as in a second heater 154 (FIG. 1), to a second temperature greater than the first temperature. In an embodiment, the first temperature is in a range between 260° F. and 300° F. and in other embodiments the first temperature is about 280° F. In an embodiment, the second temperature is in a range between 540° F. and 580° F. and in other embodiments, the second temperature is about 560° F.

During the heating step 142, 144, the flowrate of the heated regeneration gas may be increased relative to the flow rate of the unheated regeneration gas during the sweeping step 149. In an embodiment, the flow rate of the heated regeneration gas is in a range between about 30 MMSCFD and about 50 MMSCFD. In other embodiments, the flow rate of the heated regeneration gas is in a range between about 35 MMSCFD and about 40 MMSCFD. In other embodiments, the flow rate of the heated regeneration gas is about 37 MMSCFD. The duration of the heating step is a duration sufficient to restore the adsorptive capacity of the molecular sieve-based dehydration unit 100. In embodiments, the duration of the first heating step may be in a range between about 1 hour and about 2 hours and in other embodiments, the duration of the first heating step may be about 1.5 hours. In embodiments, the duration of the second heating step may be about in a range between about 5 hours and about 6 hours and in other embodiments, the duration of the second heating step may be about 5.5 hours.

The heated regeneration gas flows through the adsorbers of the molecular sieve-based dehydration unit 100 to dry the adsorbers 120 and restore the adsorptive capacity of the molecular sieve-based dehydration unit 100. In embodiment, the adsorptive capacity of the molecular sieve-based dehydration unit 100 is considered restored when the molecular sieve-based dehydration unit 100 reaches an adsorptive capacity that is at least about 90% of the maximum adsorptive capacity of the molecular sieve-based dehydration unit 100. In embodiment, the adsorptive capacity of the molecular sieve-based dehydration unit 100 is considered restored when the molecular sieve-based dehydration unit 100 reaches an adsorptive capacity that is at least about 95% of the maximum adsorptive capacity of the molecular sieve-based dehydration unit 100. In embodiment, the adsorptive capacity of the molecular sieve-based dehydration unit 100 is considered restored when the molecular sieve-based dehydration unit 100 reaches an adsorptive capacity that is at least about 98% of the maximum adsorptive capacity of the molecular sieve-based dehydration unit 100.

After the adsorbers 120 are regenerated in the sweeping 149 and heating steps 142, 144, the molecular sieve-based dehydration unit 100 is cooled in the cooling step 146 to the operation temperature for the dehydration mode. The cooling step 146 may include active cooling, such as by introducing regeneration gas into the molecular sieve-based dehydration unit 100 that is at a cooling temperature, or passive cooling whereby heat in the unit is radiated into the atmosphere. In an embodiment, the cooling step 146 includes introducing an unheated regeneration gas into the molecular sieve-based dehydration unit 100 at a cooling flowrate and for a duration sufficient to cool the molecular sieve-based dehydration unit 100 the operation temperature for the dehydration mode. In embodiments, the cooling flowrate may be in a range between about 35 MMSCFD and about 40 MMSCFD and in other embodiments, the cooling flowrate may be about 37 MMSCFD. In embodiments, the duration of the cooling step may be in a range between about 2 hours and about 3 hours and in other embodiments, the duration of the cooling step may be about 2.5 hours. After the cooling step 146 is complete, the molecular sieve-based dehydration unit 100 is ready to reenter the dehydration mode.

In some embodiments, the cyclic dehydration and regeneration processes of the molecular sieve-based dehydration unit 100 may be automatically controlled using a distributed controller system (DCS) via control block with input signals, proportional integral derivative (PID) controllers and output actions to perform all steps of the improved regeneration process 148 of FIG. 4 in the sequential order shown. Control systems are well known in the art. The logic for the control systems may be modified to implement the steps as disclosed herein to provide a robust and automated molecular sieve-based dehydration unit 100 regeneration process without need for human interference. For example, and with reference again to FIG. 1, the depressurization step is completed upon the closure of the pressure control valve (PCV) 134 located in the depressurization line 136. The logic for the control system may be modified to use the PCV closed status indication for a flow controller (FC) 164 to trigger the opening of a flow control valve 160 (FCV) arranged in regeneration line 162 with the desired flow rate and duration, such as a flowrate of about 5 MMSCFD for about 1-hour time period, for example. After the time elapses, the FC 164 sends another output signal to the FCV 160 to increase regeneration flowrate as preparation for upcoming first and second heating steps, such as a flow rate of around 37 MMSCFD. Meanwhile, a temperature controller (TC) 166 may be configured to operate one or more temperature control valves (TCV) 168 to achieve the desired temperature set points of 280° F. and 560° F. for the first and second heating steps, respectively. The unit is equipped with several air operated valves (AOVs) 170 to control the flow directions in each step.

Example

To facilitate a better understanding of the present disclosure, the following example of preferred or representative embodiments are given. In no way should the following example be read to limit, or to define, the scope of the disclosure.

A thorough engineering assessment was performed involving a molecular sieve-based dehydration unit's hydrodynamic, existing regeneration process setup, and process control logic to identify the proper way to perform the proposed sweeping step. It revealed that sweeping activity may be implemented using unheated regeneration gas at low flowrate between about 5 MMSCFD to about 20 MMSCFD.

The use of unheated regeneration gas resulted in the selective removal of trapped hydrocarbons during the sweeping step. The captured moisture was removed by the heated regeneration gas from the molecular sieve-based dehydration unit in the first and second heating steps.

Some product gas users require a stable heating value for the product gas. Spikes in the heating value of the product gas, as observed in FIG. 2, can result in the product gas being unusable by these users for portions of time when a molecular sieve-based dehydration unit is in the regeneration mode. To satisfy the requirements of these users, the regeneration gas may be recycled into the dry gas conduit for cryogenic processing in lieu of the diversion to product line, reducing plant capacity by as much as 6% and disrupting the operations of these users.

Figure 5:
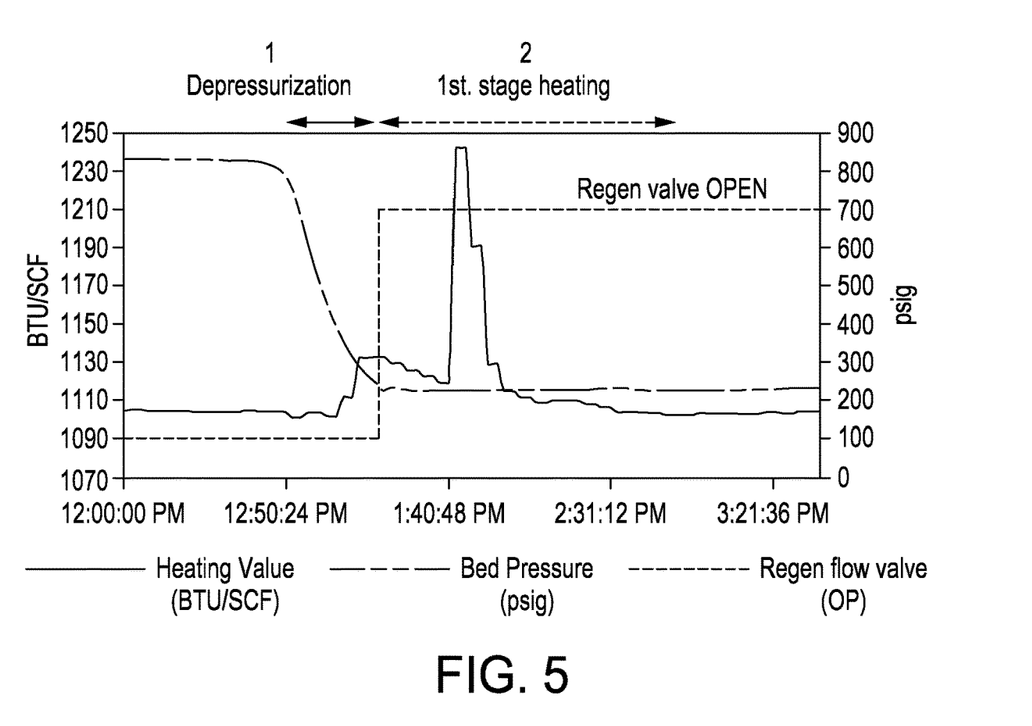
FIG. 5 is a high resolution graph of representative data of a heating value spike in a gas product line during the steps of a prior art regeneration cycle.

The heating value trend was thoroughly investigated to identify the step where trapped heavy hydrocarbons are released into the regeneration gas and diverted to methane product line, which is represented by a sharp peak in the heating value. The analysis revealed that a sharp peak of 1,240 BTU/SCF occurs during the first heating stage. It is noted that the heating value was also slightly increased during the depressurization step (FIG. 5). While some of the trapped heavy hydrocarbons were released during the depressurization step, resulting in a slight increase in heating value, most of heavy hydrocarbons are still trapped inside the molecular sieve-based dehydration unit (especially at the upper and middle compartments as the partial relieve step is undertaken from the bottom compartment). On the other hand, during the first heating step, hot regeneration gas is introduced to the molecular sieve-based dehydration unit at a high flowrate, which carries all trapped heavy hydrocarbons.

Figure 6A:
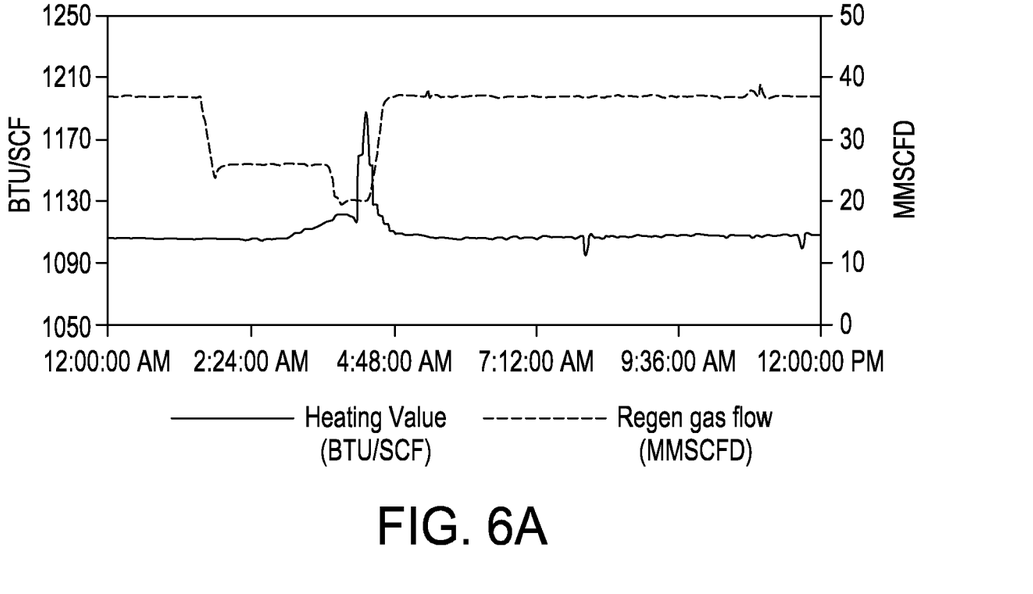
FIG. 6A is a high resolution graph of representative data of a heating value spike in a gas product line from an improved regeneration in accordance with embodiments of the disclosure.
Figure 6B:
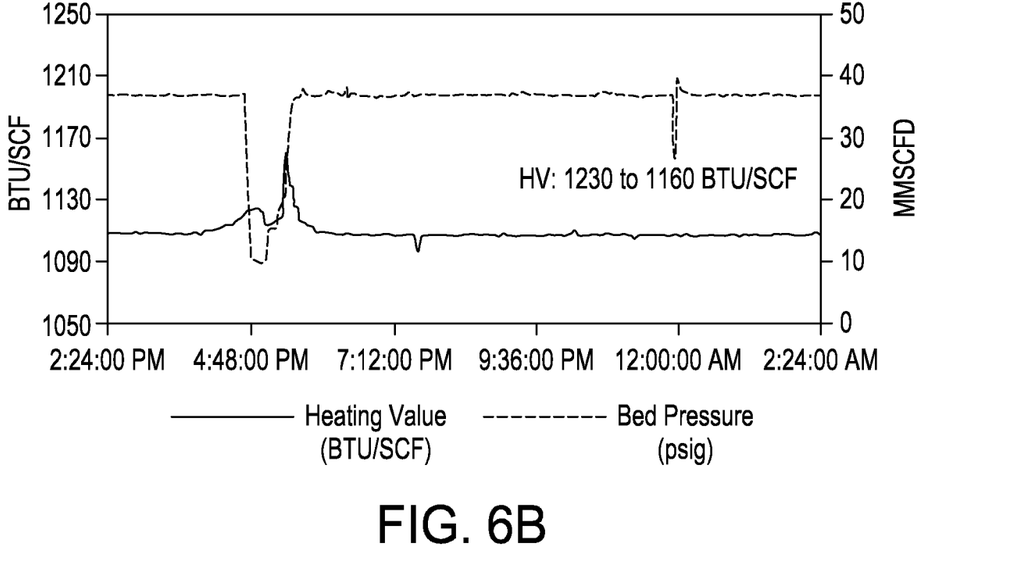
FIG. 6B is a high resolution graph of representative data of a heating value spike in a gas product line from an improved regeneration in accordance with embodiments of the disclosure.
Figure 6C:
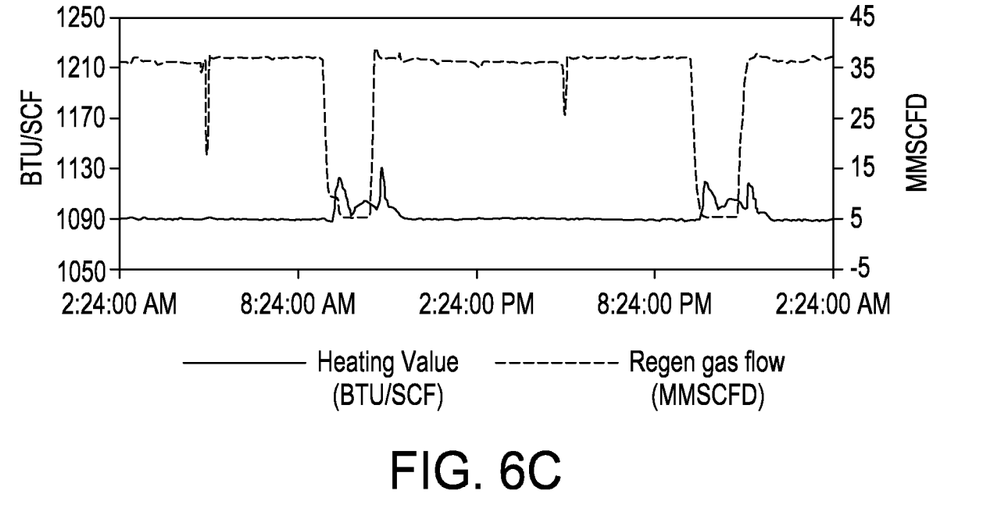
FIG. 6C is a high resolution graph of representative data of a heating value spike in a gas product line from an improved regeneration in accordance with embodiments of the disclosure.
Figure 7:
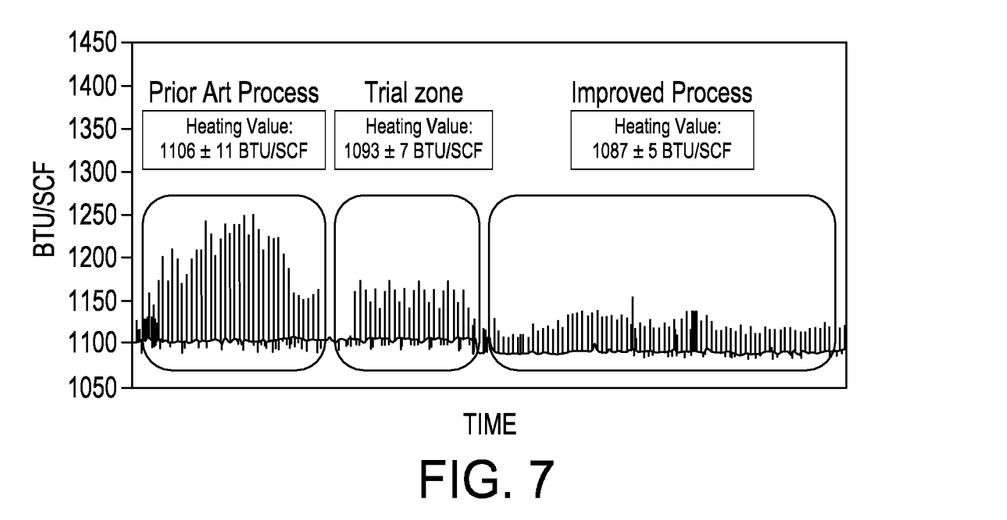
FIG. 7 is a graph of representative data showing the decrease in spikes in heating value when practicing the prior art regeneration process and when practicing an improved regeneration process in accordance with embodiments of the disclosure.

Furthermore, low sweeping flowrate was tested to in an effort to smooth removal of the trapped heavy hydrocarbons, and minimizing the fluctuations in heating value. Field trials tested various flowrate values of 20 MMSCFD, 10 MMSCFD, and 5 MMSCFD to identify the peak flowrate of sweeping values. The results of these trials showed that 20 MMSCFD sweeping rate contributed in reducing the heating value peak from 1,240 BTU/SCF to 1,190 BTU/SCF (FIG. 6A). Moreover, better performance was realized upon sweeping the dehydrator at lower rate of 10 MMSCFD, where the peak was reduced from 1,240 BTU/SCF to 1,190 BTU/SCF (FIG. 6B). Nevertheless, the optimum performance was realized at 5 MMSCFD sweeping flowrate, in which it entails smooth removal of the trapped heavy hydrocarbons with minimum impact on methane product's heating value. This is represented by a pattern of two broad heating value peaks at 1,120 BTU/SCF instead of a sharp one (FIG. 6C). Upon the sweeping at 5 MMSCFD, the overall heating value of methane product was improved as its fluctuations were clearly minimized as shown in FIG. 7.

The implementation of revised regeneration process revealed that the addition of the sweeping step reliably provides stable heating values of methane product line, which restored the plant capacity to its desired level of 100%. This novel method can be deployed easily for any recovery unit with a sensitive methane product costumer in term of heating value fluctuations.

Embodiments of the disclosure can be understood as including the following embodiments and combinations of elements. Embodiment 1: A method of restoring the adsorptive capacity of a molecular sieve-based dehydration unit utilized in drying a hydrocarbon gas, the method comprising: feeding a wet hydrocarbon gas through a molecular sieve-based dehydration unit at an operating pressure and thereby discharging a dry hydrocarbon gas; at least partially saturating adsorbers included in the molecular sieve-based dehydration unit with water and trapped heavy hydrocarbons from the wet hydrocarbon gas; depressurizing the saturated molecular sieve-based dehydration unit from the operating pressure to a pressure less than or equal to a pressure of a hydrocarbon regeneration gas; sweeping the molecular sieve-based dehydration unit with the hydrocarbon regeneration gas at a sweeping flow rate and at a sweeping temperature; heating the regeneration gas to an elevated temperature greater than the sweeping temperature and thereby generating a heated regeneration gas; heating the molecular sieve-based dehydration unit with the heated regeneration gas at a flow rate that is greater than the sweeping flow rate for a duration sufficient to restore the adsorptive capacity of the molecular sieve-based dehydration unit; and cooling the molecular sieve-based dehydration unit to the operating temperature.

Embodiment 2: The method of the embodiment 1, further comprising, introducing the regeneration gas into a product gas, wherein the sweeping flow rate and the sweeping temperature are sufficient to remove the trapped heavy hydrocarbons from the adsorbers while not raising a heating value of the product gas stream after introduction of the regeneration gas to a value greater than a threshold heating value.

Embodiment 3: The method of embodiment 2, wherein the threshold heating value is not more than 10% greater than the heating value of the regeneration gas entering the saturated molecular sieve-based dehydration unit.

Embodiment 4: The method of embodiment 2, wherein the threshold heating value is not more than 5% greater than the heating value of the regeneration gas entering the saturated molecular sieve-based dehydration unit.

Embodiment 5: The method of embodiment 2, wherein the threshold heating value is not more 75 British Thermal Units per Standard Cubic Foot ("BTU/SCF") greater than the heating value of the regeneration gas entering the saturated molecular sieve-based dehydration unit.

Embodiment 6: The method of embodiment 2, wherein the threshold heating value is a standard deviation of the heating value of the product gas after introducing the regeneration gas, wherein the standard deviation is less than about 7 BTU/SCF.

Embodiment 7: The method of embodiment 1, wherein the wet hydrocarbon gas is a wet rich hydrocarbon gas and the regeneration gas is a methane gas from a methane product line.

Embodiment 8: The method of embodiment 1, wherein the sweeping flow rate is less than about 20 Million Standard Cubic Feet Per Day ("MMSCFD").

Embodiment 9: The method of embodiment 1, wherein the sweeping flow rate is less than about 10 MMSCFD.

Embodiment 10: The method of embodiment 1, wherein the sweeping flow rate is less than about 7 MMSCFD.

Embodiment 11: The method of embodiment 1, wherein the sweeping flow rate is less than about 5 MMSCFD.

Embodiment 12: The method of embodiment 1, wherein the sweeping temperature is an ambient temperature.

Embodiment 13: The method of embodiment 1, wherein the sweeping temperature does not exceed about 120° F.

Embodiment 14: The method of embodiment 1, wherein the heating step includes heating the regeneration gas to a first elevated temperature and heating the molecular sieve-based dehydration unit with the heated regeneration gas for a first duration, followed by heating the regeneration gas to a second elevated temperature greater than the first elevated temperature and heating the molecular sieve-based dehydration unit with the regeneration gas heated to the second elevated temperature for a second duration.

Embodiment 15: The method of embodiment 14, wherein the first elevated temperature is in a range between about 260° F. and about 300° F. the second elevated temperature is in a range between about 540° F. and about 580° F.

Embodiment 16: A method of removing trapped heavy hydrocarbons from a molecular sieve-based dehydration unit, the method comprising: sweeping a molecular sieve-based dehydration unit containing trapped heavy hydrocarbons with a hydrocarbon regeneration gas at a sweeping flow rate and at a sweeping temperature, wherein the sweeping flow rate and the sweeping temperature are sufficient to remove the trapped heavy hydrocarbons from the molecular sieve-based dehydration unit while not raising a heating value of a product gas blended with the regeneration gas exiting the molecular sieve-based dehydration unit to a value greater than a threshold heating value.

Embodiment 17: The method of embodiment 16, wherein the threshold heating value is not more than 10% greater than the heating value of the regeneration gas entering the saturated molecular sieve-based dehydration unit.

Embodiment 18: The method of embodiment 15, wherein the sweeping flowrate is less than about 20 MMSCFD and the sweeping temperature does not exceed about 120° F.

Embodiment 19: A method of maintaining a heating value of a product gas blended with a regeneration gas below a threshold heating value during regeneration of a molecular sieve-based dehydration unit utilized in drying a hydrocarbon gas, the method comprising: releasing trapped heavy hydrocarbons from a saturated molecular sieve-based dehydration unit into a regeneration gas introduced into the molecular sieve-based dehydration unit at a sweeping flow rate and a sweeping temperature and introducing the regeneration gas into a product gas, wherein the sweeping flow rate and the sweeping temperature results in the heating value of the product gas after introduction of the regeneration gas remaining below a threshold heating value.

The method of embodiment 19, wherein the sweeping flowrate is less than about 20 MMSCFD and the sweeping temperature does not exceed about 100° F.

The terminology used herein is for the purpose of describing particular embodiments only and is not intended to be limiting of the invention. As used herein, for example, the singular forms "a." "an," and "the" are intended to include the plural forms as well, unless the context clearly indicates otherwise. It will be further understood that the terms "contains". "containing", "includes", "including," "comprises", and/or "comprising." and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method of restoring the adsorptive capacity of a molecular sieve-based dehydration unit utilized in drying a hydrocarbon gas, the method comprising:
   feeding a wet hydrocarbon gas through a molecular sieve-based dehydration unit at an operating pressure and thereby discharging a dry hydrocarbon gas;
   at least partially saturating adsorbers included in the molecular sieve-based dehydration unit with water and trapped heavy hydrocarbons from the wet hydrocarbon gas;
   depressurizing the saturated molecular sieve-based dehydration unit from the operating pressure to a pressure less than or equal to a pressure of a hydrocarbon regeneration gas;
   sweeping the molecular sieve-based dehydration unit with the hydrocarbon regeneration gas at a sweeping flow rate and at a sweeping temperature;
   heating the regeneration gas to an elevated temperature greater than the sweeping temperature and thereby generating a heated regeneration gas;
   heating the molecular sieve-based dehydration unit with the heated regeneration gas at a flow rate that is greater than the sweeping flow rate for a duration sufficient to restore the adsorptive capacity of the molecular sieve-based dehydration unit; and
   cooling the molecular sieve-based dehydration unit to an operating temperature.

2. The method of claim 1, further comprising, introducing the regeneration gas into a product gas, wherein the sweeping flow rate and the sweeping temperature are sufficient to remove the trapped heavy hydrocarbons from the adsorbers while not raising a heating value of the product gas stream after introduction of the regeneration gas to a value greater than a threshold heating value.

3. The method of claim 2, wherein the threshold heating value is not more than 10% greater than the heating value of the regeneration gas entering the saturated molecular sieve-based dehydration unit.

4. The method of claim 2, wherein the threshold heating value is not more than 5% greater than the heating value of the regeneration gas entering the saturated molecular sieve-based dehydration unit.

5. The method of claim 2, wherein the threshold heating value is not more 75 British Thermal Units per Standard Cubic Foot ("BTU/SCF") greater than the heating value of the regeneration gas entering the saturated molecular sieve-based dehydration unit.

6. The method of claim 2, wherein the threshold heating value is a standard deviation of the heating value of the product gas after introducing the regeneration gas, wherein the standard deviation is less than about 7 BTU/SCF.

7. The method of claim 1, wherein the wet hydrocarbon gas is a wet rich hydrocarbon gas and the regeneration gas is a methane gas from a methane product line.

8. The method of claim 1, wherein the sweeping flow rate is less than about 20 Million Standard Cubic Feet Per Day ("MMSCFD").

9. The method of claim 1, wherein the sweeping flow rate is less than about 10 MMSCFD.

10. The method of claim 1, wherein the sweeping flow rate is less than about 7 MMSCFD.

11. The method of claim 1, wherein the sweeping flow rate is less than about 5 MMSCFD.

12. The method of claim 1, wherein the sweeping temperature is an ambient temperature.

13. The method of claim 1, wherein the sweeping temperature does not exceed about 120° F.

14. The method of claim 1, wherein the heating step includes heating the regeneration gas to a first elevated temperature and heating the molecular sieve-based dehydration unit with the heated regeneration gas for a first duration, followed by heating the regeneration gas to a second elevated temperature greater than the first elevated temperature and heating the molecular sieve-based dehydration unit with the regeneration gas heated to the second elevated temperature for a second duration.

15. The method of claim 14, wherein the first elevated temperature is in a range between about 260° F. and about 300° F. the second elevated temperature is in a range between about 540° F. and about 580° F.

16. A method of removing trapped heavy hydrocarbons from a molecular sieve-based dehydration unit, the method comprising:
sweeping a molecular sieve-based dehydration unit containing trapped heavy hydrocarbons with a hydrocarbon regeneration gas at a sweeping flow rate and at a sweeping temperature, wherein the sweeping flow rate and the sweeping temperature are sufficient to remove the trapped heavy hydrocarbons from the molecular sieve-based dehydration unit while not raising a heating value of a product gas blended with the regeneration gas exiting the molecular sieve-based dehydration unit to a value greater than a threshold heating value.

17. The method of claim 16, wherein the threshold heating value is not more than 10% greater than the heating value of the regeneration gas entering the saturated molecular sieve-based dehydration unit.

18. The method of claim 16, wherein the sweeping flowrate is less than about 20 MMSCFD and the sweeping temperature does not exceed about 120° F.

19. A method of maintaining a heating value of a product gas blended with a regeneration gas below a threshold heating value during regeneration of a molecular sieve-based dehydration unit utilized in drying a hydrocarbon gas, the method comprising:
releasing trapped heavy hydrocarbons from a saturated molecular sieve-based dehydration unit into a regeneration gas introduced into the molecular sieve-based dehydration unit at a sweeping flow rate and a sweeping temperature and introducing the regeneration gas into a product gas, wherein the sweeping flow rate and the sweeping temperature result in the heating value of the product gas after introduction of the regeneration gas remaining below a threshold heating value.

20. The method of claim 19, wherein the sweeping flowrate is less than about 20 MMSCFD and the sweeping temperature does not exceed about 120° F.

* * * * *